Oct. 15, 1940.                G. QUILLIN                2,217,993
                               DUAL WHEEL
                          Filed Feb. 21, 1939              3 Sheets-Sheet 1
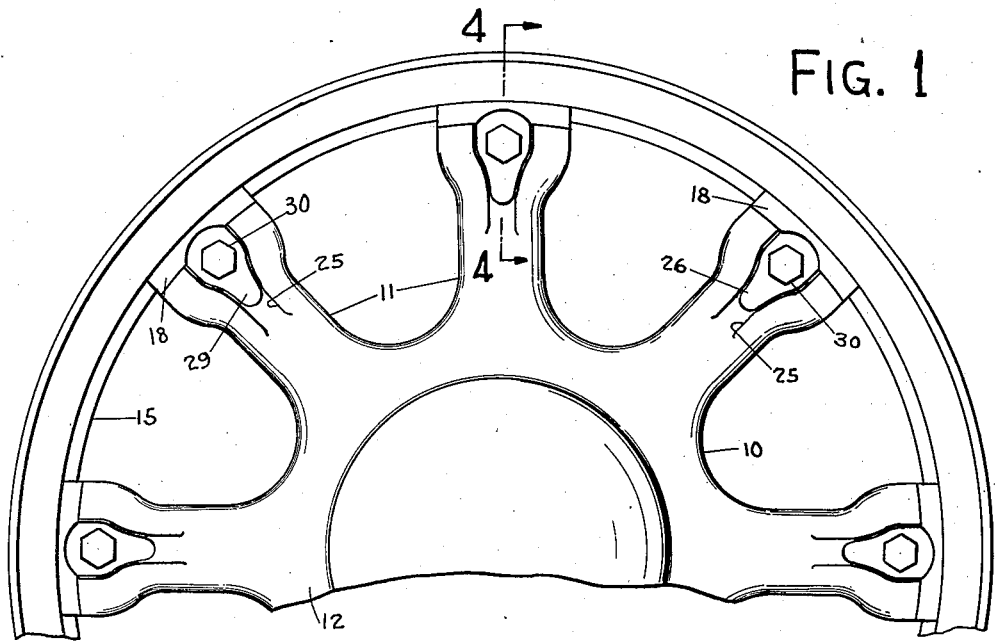
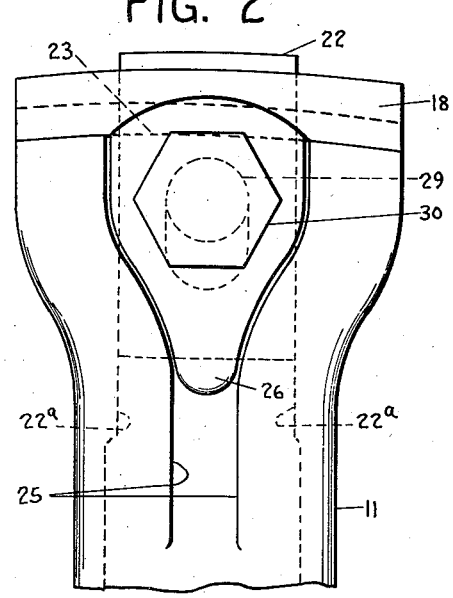
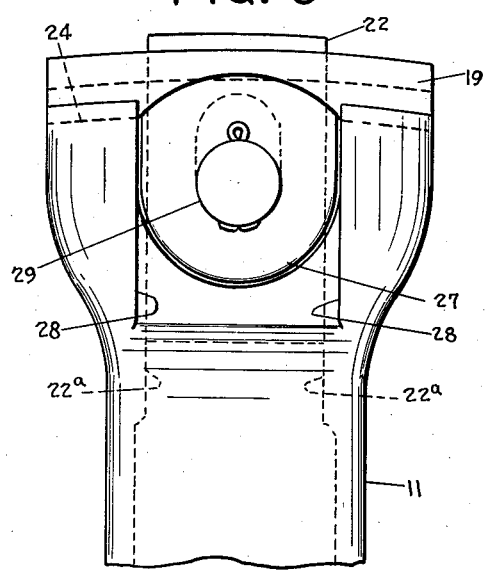
INVENTOR
GILVIN QUILLIN
BY
*J. Ralph Barrow*
ATTORNEY Oct. 15, 1940.  G. QUILLIN  2,217,993
DUAL WHEEL
Filed Feb. 21, 1939  3 Sheets-Sheet 2

INVENTOR
GILVIN QUILLIN

ATTORNEY

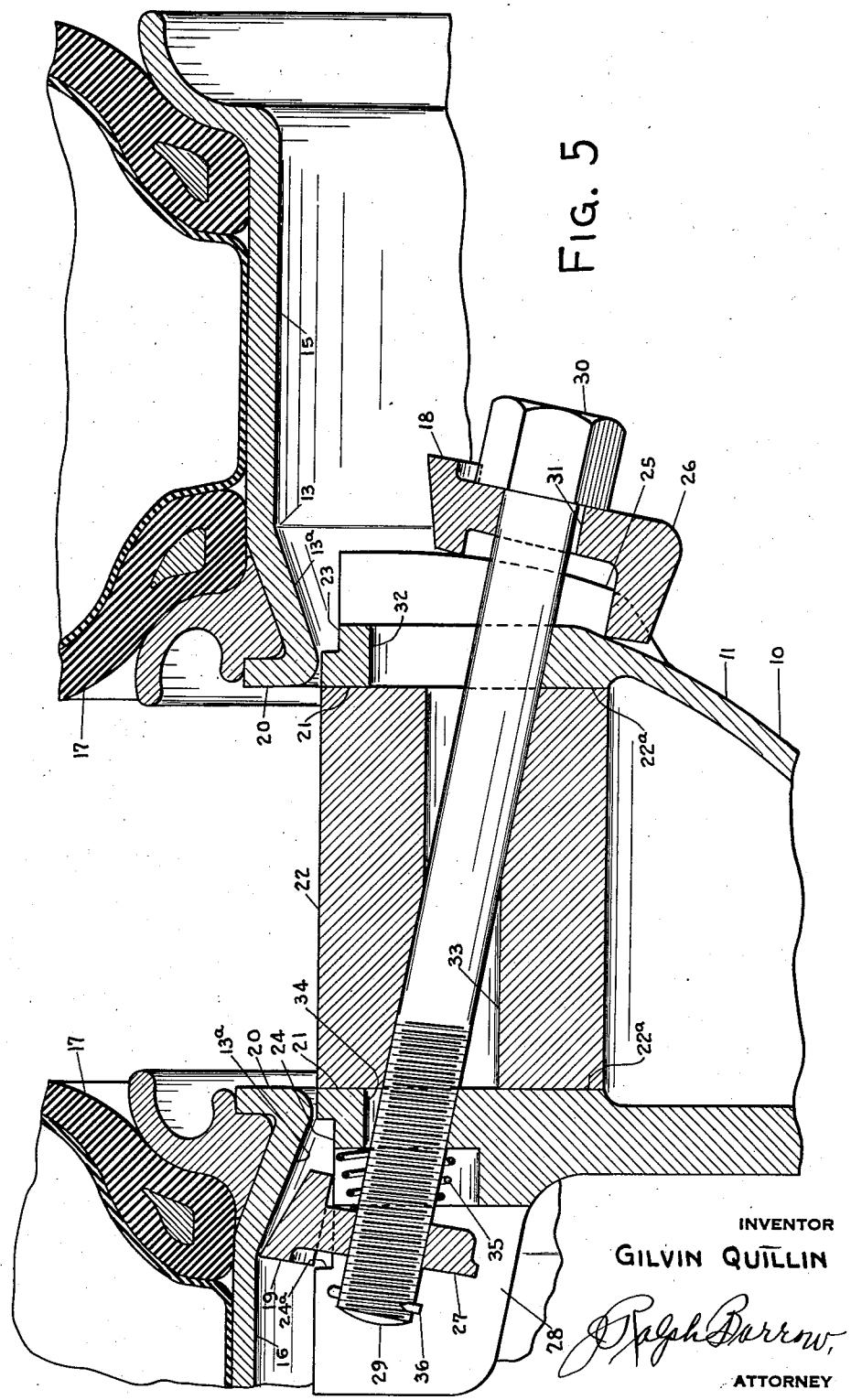

Patented Oct. 15, 1940

2,217,993

UNITED STATES PATENT OFFICE 2,217,993

DUAL WHEEL

Gilvin Quillin, Akron, Ohio

Application February 21, 1939, Serial No. 257,639

12 Claims. (Cl. 301—13)

This invention relates to dual rimmed vehicle wheels.

Heretofore numerous constructions have been employed for clamping or retaining dual rims in spaced relation on vehicle wheels, but these constructions usually have employed numerous parts which were required to be completely removed from the wheel before the rims could be dismounted from or mounted on the wheel. Most of the clamping assembly parts had to be handled piece by piece and the rim mounting or dismounting operations were usually awkward, tedious, and arduous, and often injurious to the operator. Parts were frequently lost or misplaced, thereby making the wheel assembly unsafe for normal use.

A general object of this invention is to provide improved means for securing dual rims in accurately spaced relation on a vehicle wheel.

Another object of the invention is to provide means for mounting and dismounting dual rims on wheels without necessarily removing the rim clamping or retaining means from the wheel.

Another object of the invention is to provide in dual rimmed vehicle wheels means for mounting and dismounting both rims from one side of the wheel in a substantially rapid and facile manner, and with a minimum of danger to the operator.

Another object of the invention is to provide a wheel of the character described having a greater factor of safety because danger from loosened or lost parts of the rim retaining or clamping means is materially minimized.

Other objects will be manifest from the following brief description and the accompanying drawings.

Of the accompanying drawings:

Figure 1 is an elevational view, partly broken away, of a wheel embodying the invention.

Figure 2 is an enlarged detailed front view of a spoke-end having the improved rim retaining means thereon.

Figure 3 is a similar view of the rear of a spoke-end.

Figure 5 is a view similar to Figure 4 showing the clamping and spacer means collapsed to permit removal of both rims from one side of the wheel.

Figure 4:
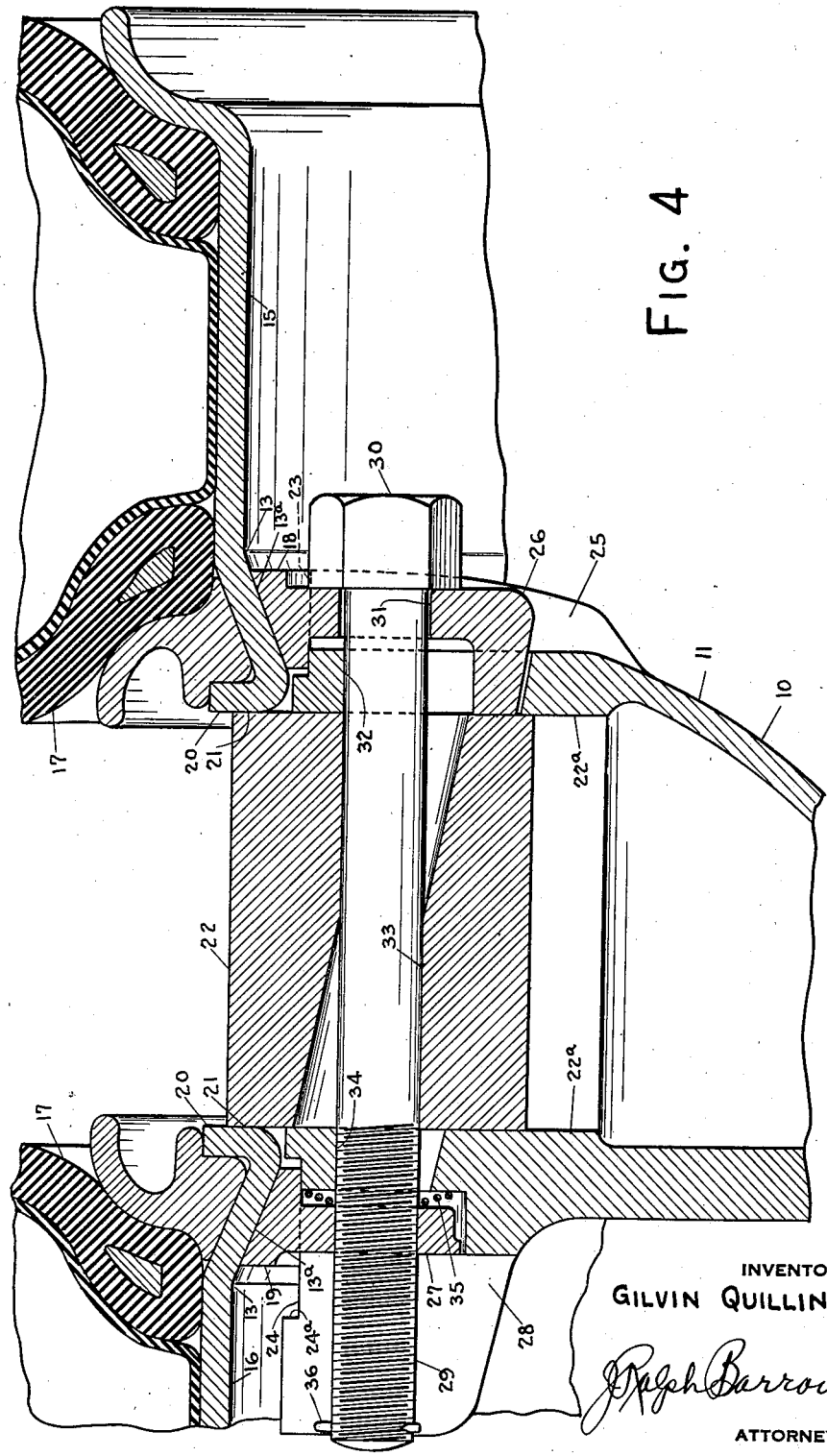
Figure 4 is a cross-section taken substantially on line 4—4 of Figure 1, and illustrating the manner of clamping the dual rims in spaced relation on a spoke end.

Referring to the drawings, numeral 10 designates a fellyless wheel of known type, preferably of cast metal and having hollow spokes 11 extending radially from the hub portion 12, it being understood that the present invention is not limited to use with a fellyless wheel, but may also be incorporated into a felly type wheel having integral spokes similar in construction to spokes 11. The outer end faces of the spokes preferably are curved circumferentially of the wheel 10 to a diameter slightly less than the inside diameters of annular gutter portions 13, 13 of outboard and inboard rims 15 and 16, respectively, these rims being of conventional type for pneumatic tires 17, 17.

The gutter portions 13 of rims 15 and 16 are provided with the usual radially inwardly inclined faces 13ª, 13ª against which oppositely disposed beveled mounting members 18 and 19 are shiftable to urge outwardly extending flanges 20, 20 of gutter portions 13 into abutment with side faces 21, 21 of a spacer-block 22, projecting from the end of spoke 11. Block 22 preferably is rectangular in shape and may be radially shiftable in a similarly shaped recess 22ª in the end of spoke 11. The outer face of spoke 11 may be suitably recessed at 23 and 24 to provide seats upon which rim mountings 18 and 19 are laterally shiftable, and an abutment 24ª may be provided at the inboard side of the spoke-end to prevent mounting member 19 from slipping from its seat 24 while the mounting members 18 and 19 are being adjusted.

The outboard face of spoke 11 may have a recess 25 for receiving a lug 26 which extends radially inwardly from mounting member 18 (see Figures 1, 2, 3 and 4), and mounting member 19 may have a similar lug 27 which extends into a recess 28 on the inboard face of spoke 11. A bolt 29 having a head 30, for engagement against lug 26 and adapted to be engaged by a suitable wrench or turning tool (not shown), may be extended through laterally aligned apertures 31 in lug 25, 32 in the outboard wall of spoke 11, 33, in spacer 32, and 34 in inboard wall of spoke 11, and the inboard end of the bolt preferably is threaded into lug 27 on mounting member 19, the arrangement being such that turning head 30 in the proper directions wedges the rims 15 and 16 into abutment with spacer 22 or loosens mounting members 18 and 19 for removal of the rims.

The lug 26 of mounting member 18 may be provided with a laterally inwardly extending flange for engagement with block 22 thereby to maintain lug 26 in proper alignment when bolt 29 is tightened against it.

The aperture 33 in spacer 22 may be tapered radially inwardly and outwardly from the central portion of the aperture toward the outboard and inboard sides of the spoke, respectively, as best shown in Figures 4 and 5, so that upon loosening bolt 29 clamp 18 may be slipped from its seat 24 over the outboard edge of the spoke, thereby tilting the outboard end of bolt 29 radially inwardly and drawing spacer-block 22 into the recess 22ª until the outer faces of the spacer 22 and spoke 11 are substantially flush with each other. The apertures 32 and 34 are suitably enlarged or tapered to permit such tilting of bolt 29. A coil spring 35 preferably is extended between spoke 11 and lug 27 of inboard mounting 19 to retain the clamping parts in the collapsed positions thereof shown in Figure 5, the coils of spring 35 being adapted to be in nesting relation when the parts are clamped, as shown in Figure 4. Bolt 29 preferably is of sufficient length to allow complete collapsing of the clamping means, as shown in Figure 5, without necessarily disconnecting any of the parts from the spoke 11, and a suitable pin or stop 36 may be provided on the inboard end of bolt 29 to prevent the clamping parts from being accidentally disconnected.

In mounting the dual rims 15 and 16 on wheel 10 the respective clamping assemblies on the spokes 11 are first arranged as shown in Figure 5, the spacers 22 being withdrawn radially into recesses 22ª in the spokes to permit both rims to be mounted from the outboard side of the wheel 10. When the rim assemblies are arranged on the wheel substantially as shown in Figure 5, mounting members 18 and 19 are swung onto their respective seats 23 and 24, thereby lifting bolts 29 into abutment with the radially outer portions of the apertures 32 and 34 in the ends of spokes 11 and shifting spacers 22 radially outwardly to project from the ends of the spokes. Tightening bolts 29 thereby wedges mounting members 18 and 19 against the respective gutter portions 13 of the rims 15 and 16 and urges the flanges 20 of the rims into abutment with the exposed faces 21 of spacers 22 (see Figure 4).

In dismounting the dual rims from wheel 10 the foregoing procedure for mounting the rims is reversed.

It will readily be seen that a simple, effective means has been provided for quickly and easily mounting or dismounting dual rims on vehicle wheels from one side thereof, without detaching any of the rim clamping or retaining elements from the wheel. The usual slow, awkward, or arduous process of removing the clamping and spacing members piece by piece, to permit mounting or dismounting of the rim assembly from one side of the wheel, has been obviated.

Modifications of the invention may be resorted to without departing from the spirit thereof or the scope of the appended claims.

What is claimed is:

1. The combination with a wheel for dual tire-rims, said wheel having laterally spaced rim mounting members thereon, of a radially shiftable spacer element between said mounting members, and means for clamping rims on said mounting members in abutment with opposite sides of said spacer, said clamping means being engageable with said spacer for radially shifting the same, said clamping means being releasable to shift said spacer radially inwardly of the wheel to permit mounting and dismounting both of said rims from one side of said wheel.

2. The combination with a wheel for dual tire-rims having laterally spaced rim mounting members thereon, one of said mounting members being radially shiftable inwardly of the wheel, of a radially shiftable spacer element between said mounting members, and means associated with said spacer and said shiftable mounting member for clamping rims on said mounting members in abutment with said spacer when said spacer is in an outer position on said wheel, said clamping means being releasable whereby said spacer and said shiftable mounting members are depressible inwardly from the clamping positions thereof to permit mounting and dismounting both of said rims from one side of said wheel.

3. The combination with a wheel for dual tire-rims having laterally spaced rim mounting members thereon one of said mounting members being radially shiftable inwardly of the wheel, of a radially shiftable spacer element between said mounting members, means associated with said spacer and said shiftable mounting member for clamping rims on said mounting member in abutment with said spacer when said spacer is in an outer position on said wheel, said clamping means being depressible at will simultaneously to depress said spacer and said shiftable mounting member inwardly from the clamping positions thereof to permit mounting and dismounting both of said rims from one side of said wheel, and yieldable means for retaining said spacer and said shiftable mounting in the depressed positions thereof.

4. The combination with a wheel for dual tire-rims having radial spokes, of spaced rim mounting members laterally shiftable on the ends of said spokes, the mounting members on one side of said spokes being radially shiftable inwardly of the wheel, radially shiftable spacer elements between said mounting members, means for laterally shifting said mounting members to clamp said rims in abutment with said spacers in the outer position thereof, said spacers and radially shiftable elements being shiftable inwardly of the ends of the spokes to permit mounting and dismounting of said rims from one side of said wheel, and yieldable means for retaining said spacers and radially shiftable mounting members in the radially inward positions thereof.

5. The combination with a wheel for dual tire-rims, of laterally spaced rim mounting members, laterally shiftable on a radially outer face of said wheel, a radially shiftable spacer element between said mounting members, and a bolt extended through apertures in said wheel and said spacer for laterally shifting said mounting members to clamp rims thereon in abutment with opposite sides of said spacer when said spacer is in an outer position on said wheel, said mounting members on said bolt being shiftable laterally outwardly to allow said bolt to be depressed radially inwardly, thereby to depress said spacer radially inwardly of the wheel to permit mounting and dismounting both of said rims from one side of said wheel.

6. The combination with a wheel for dual tire-rims, of laterally spaced rim mounting members laterally shiftable on a radially outer face of said wheel, a radially shiftable spacer element between said mounting members, and a bolt extended through apertures in said wheel and said spacer for laterally shifting said mounting members to clamp rims thereon in abutment with opposite sides of said spacer when said spacer is in an outer position on said wheel, one of said mounting members on said bolt being shiftable laterally outwardly to allow said bolt to be swung radially inwardly, thereby to depress said spacer radially inwardly of the wheel to permit mounting and dismounting both of said rims from one side of said wheel.

7. The combination with a wheel for dual tire-rims, of laterally spaced rim mounting members laterally shiftable on a radially outer face of said wheel, a radially shiftable spacer element between said mounting members, a bolt extended through apertures in said wheel and said spacer for laterally shifting said mounting members to clamp rims thereon in abutment with opposite sides of said spacer when said spacer is in an outer position on said wheel, said mounting members on said bolt being shiftable laterally outwardly to allow said bolt to be depressed radially inwardly, thereby to depress said spacer radially inwardly of the wheel, and yieldable means for retaining said bolt and associated parts in said radially inwardly depressed positions thereof to permit mounting and dismounting both of said rims from one side of said wheel.

8. The combination with a wheel for dual tire-rims of laterally spaced rim mounting members laterally shiftable on a radially outer face of said wheel, said mounting members having radially inwardly extending lugs, a radially shiftable spacer element between said mounting members, and a bolt extended through apertures in said wheel and said spacer and adjustably connected to said lugs for laterally shifting said mounting members to clamp rims thereon in abutment with opposite sides of said spacer when said spacer is in an outer position on said wheel, one of said mounting members carried by said bolt being relatively shiftable laterally outwardly to allow said bolt to be depressed angularly inwardly of said wheel, thereby to depress said spacer radially inwardly of the wheel to permit mounting and dismounting both of said rims from one side of said wheel.

9. The combination with a wheel for dual tire-rims of laterally spaced rim mounting members laterally shiftable on a radially outer face of said wheel, said mounting members having radially inwardly extending lugs, a radially shiftable spacer element between said mounting members, a bolt extended through apertures in said wheel and said spacer and adjustably connected to said lugs for laterally shifting said mounting members to clamp rims thereon in abutment with opposite sides of said spacer when said spacer is in an outer position on said wheel, one of said mounting members carried by said bolt being relatively shiftable laterally outwardly to allow said bolt to be depressed angularly inwardly of said wheel, thereby to depress said spacer radially inwardly of the wheel, and a compression spring disposed between said wheel and the lug of said other mounting member for retaining said bolt and associated parts in said radially inwardly depressed positions thereof to permit mounting and dismounting both of said rims from one side of said wheel.

10. The combination with a wheel for dual tire-rims having radial spokes, said spokes having on the outer ends thereof laterally shiftable spaced members each adapted to have a rim mounted thereon, and clamping means for laterally shifting said mounting members to clamp rims thereon, said clamping means being radially shiftable on said spokes, the mounting members on one side of said spokes being shiftable outwardly and depressible radially inwardly with said clamping means as a unit to permit mounting and dismounting both of said rims from one side of said wheel.

11. The combination with a wheel for dual tire-rims, of laterally spaced rim mounting members laterally shiftable on a radially outer face of said wheel, a radially shiftable spacer element between said mounting members, and a bolt extended through apertures in said wheel at opposite sides of said spacer and through an aperture in said spacer, said bolt being operable for laterally shifting said mounting members to clamp rims thereon in abutment with opposite sides of said spacer when said spacer is in an outer position on said wheel, the wheel aperture at one side of said spacer being enlarged to permit said bolt to fulcrum on said wheel at the other side of the spacer, said spacer aperture being tapered radially inwardly from a point intermediate the ends of the spacer toward said one side of the wheel and radially outwardly toward said other side of the wheel to permit said bolt to tilt about said intermediate point when the bolt is swung about said fulcrum, whereby said mounting members are shiftable laterally outwardly to allow said bolt to be swung inwardly from one side of the wheel to depress said spacer radially inwardly of the wheel to permit mounting and dismounting both of said rims from one side of said wheel.

12. The combination with a wheel for dual tire-rims, of laterally spaced rim mounting members laterally shiftable on a radially outer face of said wheel, a radially shiftable spacer element between said mounting members, a bolt extended through apertures in said wheel and said spacer for laterally shifting said mounting members to clamp rims thereon in abutment with opposite sides of said spacer when said spacer is in an outer position on said wheel, one of said mounting members on said bolt being shiftable laterally outwardly to allow said bolt to be tilted radially inwardly, thereby to depress said spacer radially inwardly of the wheel, and a compression spring between one of said mounting members and said wheel for retaining said bolt and associated parts in said radially inwardly depressed positions thereof, said spacer aperture having tapered portions for permitting the bolt to be tilted relative to the spacer when said bolt is swung radially inwardly.

GILVIN QUILLIN.